United States Patent [19]

Bardin et al.

[11] 3,979,297

[45] Sept. 7, 1976

[54] MEMBRANE SUPPORT-PLATES FOR FLUID SEPARATING APPARATUS AND APPARATUS USING SUCH SUPPORT-PLATES

[75] Inventors: Robert Bardin, Vienne; André Toulouze, Lyon, both of France

[73] Assignee: Rhone-Poulenc S.A., Paris, France

[22] Filed: May 28, 1974

[21] Appl. No.: 473,739

[30] Foreign Application Priority Data

May 29, 1973 France .............................. 7319533

[52] U.S. Cl. .............................. 210/232; 210/321 R
[51] Int. Cl.² .......................................... B01D 31/00
[58] Field of Search ........... 210/321, 232, 486, 417, 210/343, 433, 346

[56] References Cited
UNITED STATES PATENTS

| | | |
|---|---|---|
| 3,142,642 | 7/1964 | Kracklauer ........................ 210/232 |
| 3,263,819 | 8/1966 | Schmidt et al ...................... 210/486 |
| 3,378,480 | 4/1968 | Reinshagen et al ................. 210/321 X |
| 3,425,560 | 2/1969 | Smythe ............................. 210/321 X |
| 3,809,246 | 5/1974 | Niogret ............................. 210/433 X |
| 3,831,763 | 8/1974 | Breysse et al ...................... 210/346 X |

*Primary Examiner*—Frank A. Spear, Jr.
*Attorney, Agent, or Firm*—Cushman, Darby & Cushman

[57] ABSTRACT

Membrane support-plates for fluid separating apparatus, and apparatus using such support-plates, wherein the support-plates are generally rectangular, being formed of two stamped metal plate elements arranged back-to-back, each element having a cell in its face over which extends a membrane, an elongate orifice adjacent one or both ends thereof for the introduction of fluid to be treated, and a detachable device located in each face having a membrane, to hold the membrane over the entire periphery of the cavity.

14 Claims, 24 Drawing Figures

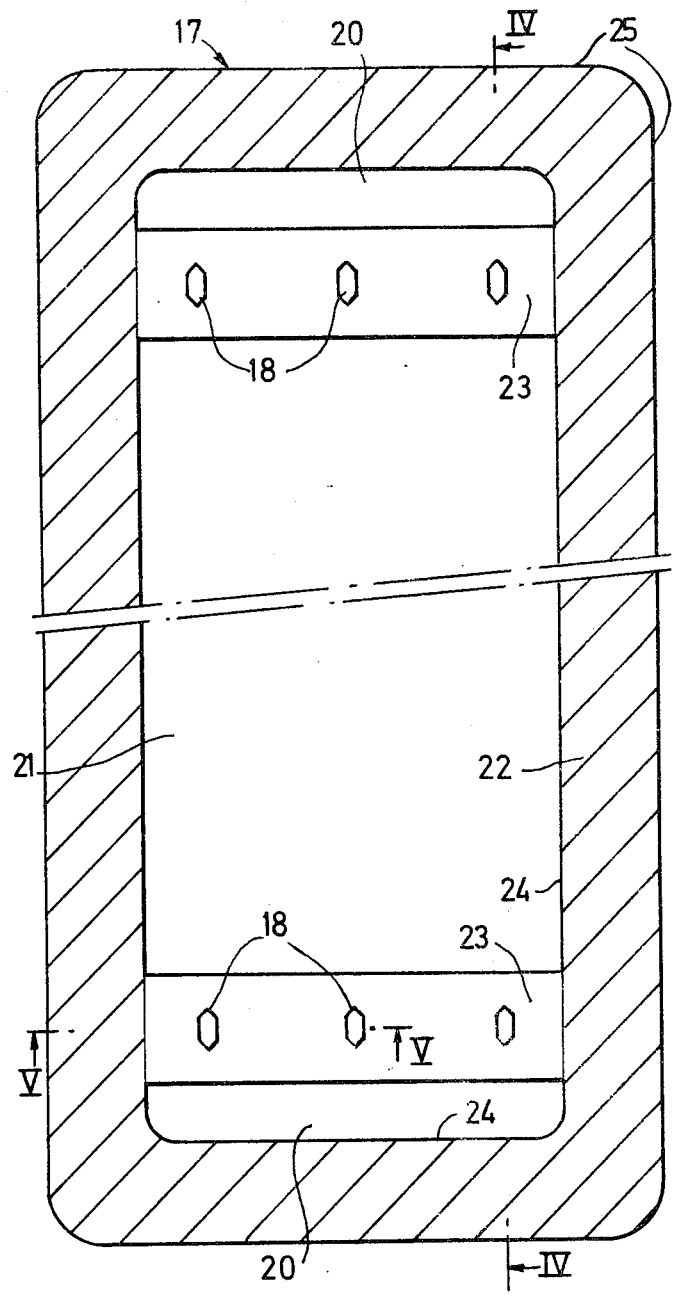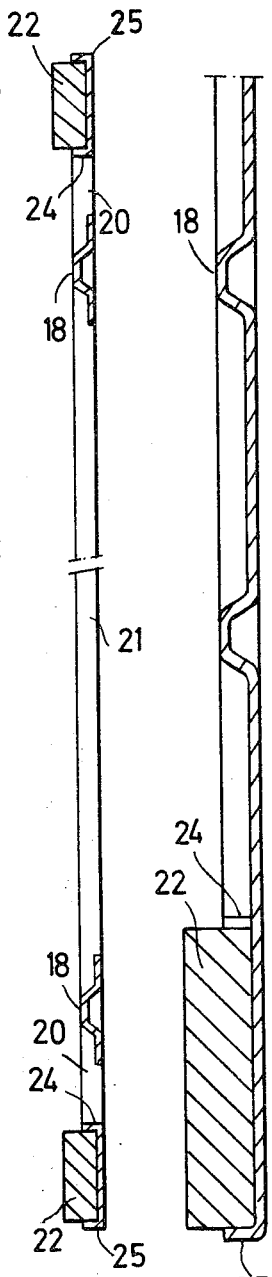
FIG.3.     FIG.4.   FIG.5.

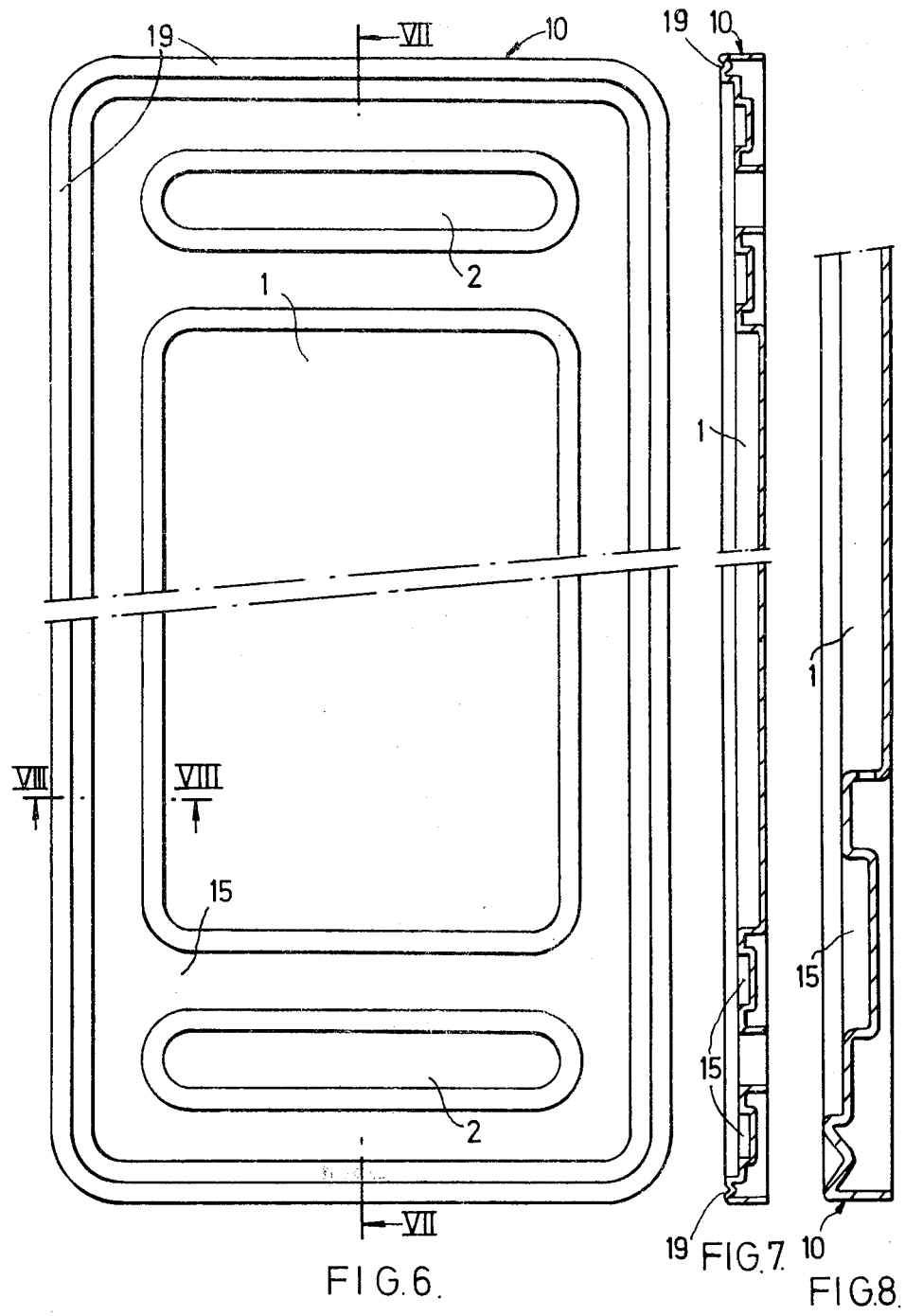

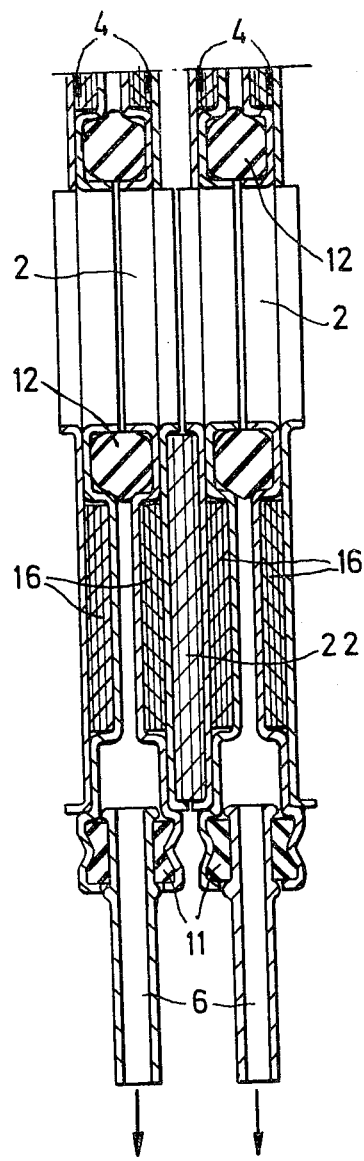
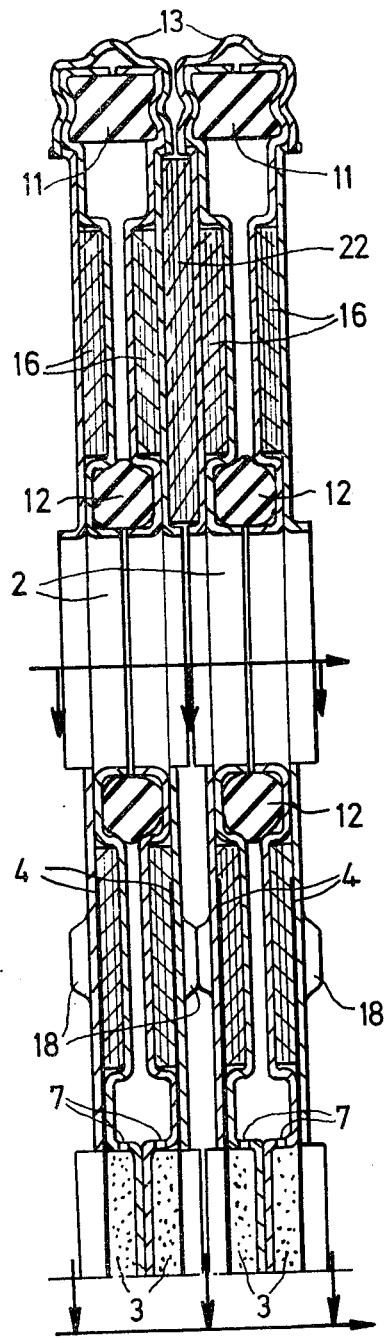
FIG.10.
FIG.11.

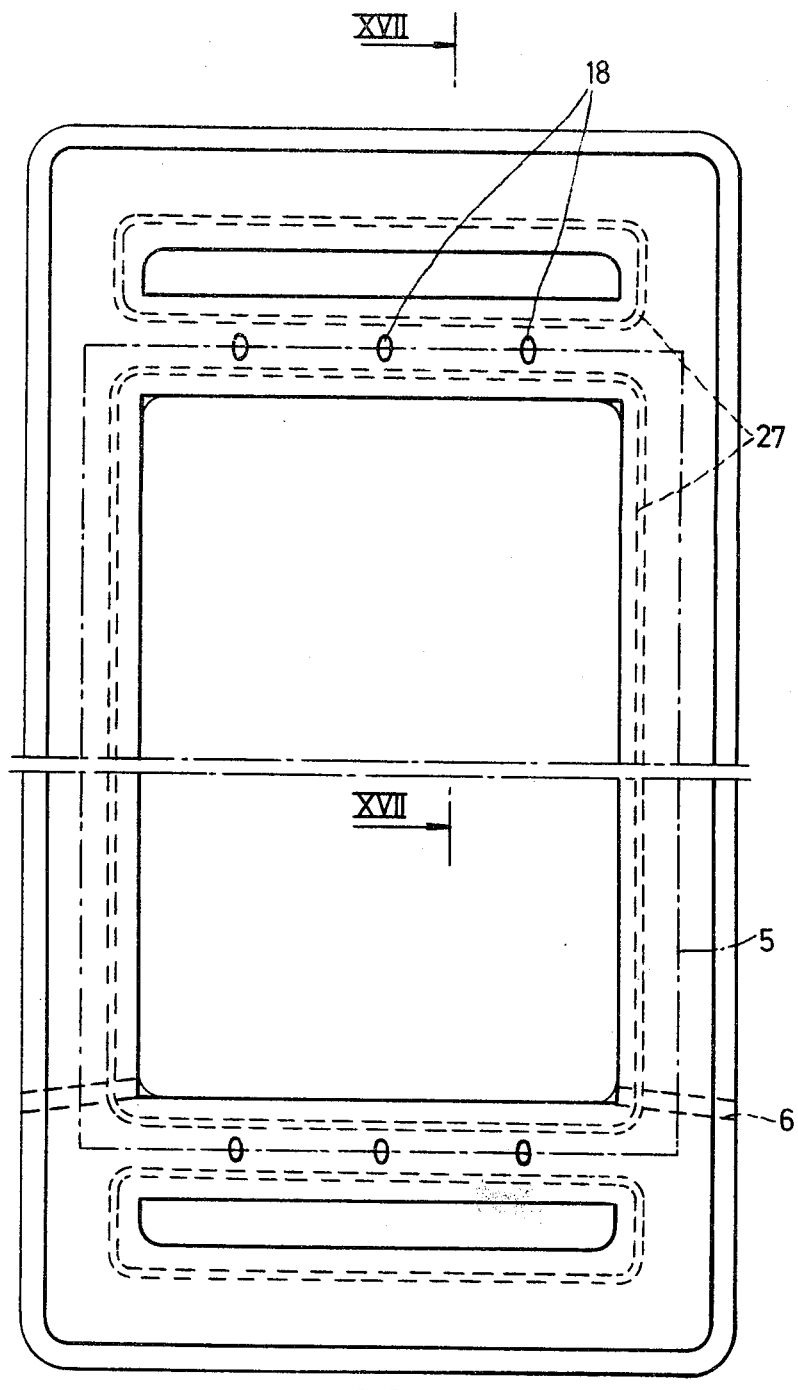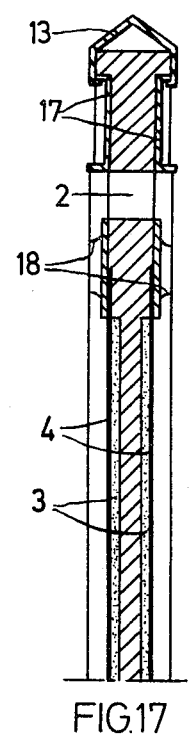
FIG.16
FIG.17

MEMBRANE SUPPORT-PLATES FOR FLUID SEPARATING APPARATUS AND APPARATUS USING SUCH SUPPORT-PLATES

The present invention relates to a membrane support-plate for fluid separating apparatus.

Apparatuses and support-plates of this type are known, especially from German application Ser. No. 2,209,116, in which the membrane support-plates, which are generally rectangular, possess, at each end, an elongate orifice through which the fluid to be treated passes, and, on each face, a cell which preferably contains a packing on which rests a membrane which covers the edges of the said cell; the edges are equipped with at least one pipeline for discharging the fluid which has passed through the membrane.

In such apparatuses, the fluid to be treated flows under presssure in contact with the membranes and the latter are held in a leakproof manner on the longitudinal edges of each cell by gaskets, after clamping the latter and the support-plates between two end-plates. However, since the membranes cannot be held transversely in a leakproof manner by the gaskets between the cell and the elongate orifice, it has been proposed to glue the membranes at these places.

However, it appeared advantageous, in order to use these plates, to hold the membranes transversely in a leakproof manner between the edge of each cell and the elongated orifice by means of a reliable mechanical device which was easy to assemble and dismantle.

Moreover, as has been stated above, on the support-plates of the prior art, the membranes were held by the gaskets on the longitudinal edges of the cells only at the time of clamping the support-plates in the apparatus. Before clamping, each support-plate has a membrane on each face and possibly a gasket on one of its faces, but this gasket holds the membrane to only a very slight extent. However, it appeared advantageous, in order to handle the plates conveniently and in order to avoid damaging the membranes, to hold the membranes laterally, before clamping the support-plates in the apparatus.

According to the present invention we provide a membrane support-plate for fluid separation apparatus, said support plate comprising a generally rectangular support plate, having at least one orifice near one of its ends for the passage of fluid to be treated, at least one cell on at least one of the faces of the plates, a membrane covering said at least one cell, means communicating said cell with the exterior for discharging permeate which passes through said membrane, and a detachable device positioned on each face having a membrane, said device holding a membrane over the entire periphery of the cavity.

With such a construction it is possible to dispose with any transverse gluing of membranes to the support-plates. Furthermore, it is possible to hold the membrane on the longitudinal edges of each cell, before clamping the support-plate in the apparatus.

The present invention also relates to any apparatus equipped with one or more support-plates as defined above, alternating with gaskets between two end-plates.

In order that the present invention will be better understood, the following description is given, merely by way of example, reference being made to the accompanying drawings, in which:

FIG. 3 is a plan view of one embodiment of a removable membrane-fixing device;

FIG. 4 is a cross-sectional view taken along the line IV—IV of the removable device of FIG. 3;

FIG. 5 is a cross-sectional view taken along the line V—V of the removable device of FIG. 3;

FIG. 6 is a plan view of one of the two elementary plates of the support-plate of FIG. 1;

FIG. 7 is a cross-sectional view taken along the line VII—VII of the elementary plate of FIG. 6;

FIG. 8 is a cross-sectional view taken along the line VIII—VIII of the elementary plate of FIG. 6;

FIG. 10 is a cross-section taken along the line X—X of FIG. 1;

FIG. 11 is a cross-section taken along the line XI—XI of FIG. 1;

FIG. 16 is a plan view of a support-plate made in a single piece with a removable membrane-fixing device on each of its faces;

FIG. 17 is a partial cross-section taken along the line XVII—XVII of the support-plate of FIG. 16, with a removable device on each face;

A support-plate according to the present invention is of generally rectangular shape and has, at least on one of its faces, at least one cell preferably containing a porous packing on which a membrane rests and projects beyond the edge of the cell.

Optionally, this cell may not have any packing, especially when a screen-reinforced membrane is used, if the base of the cell has a surface with a sufficient number of protuberances of suitable size such that their upper part supports the membrane whilst they leave sufficient space between them to enable the fluid, called the permeate, which has passed through the membrane, to flow. These protuberances can also consist of a detachable part, placed on the preferably flat base of the cell. Each cell communicates with at least one pipeline for discharging the permeate. A support-plate also has at least at one of its ends, at least one elongate orifice, the width of which corresponds substantially to the width of the cell, this elongate orifice allowing the fluid to be treated to flow. In order to fix the membrane to the contour of the cell, a support-plate comprises a removable device which holds the membrane in a leakproof manner.

Figure 1:
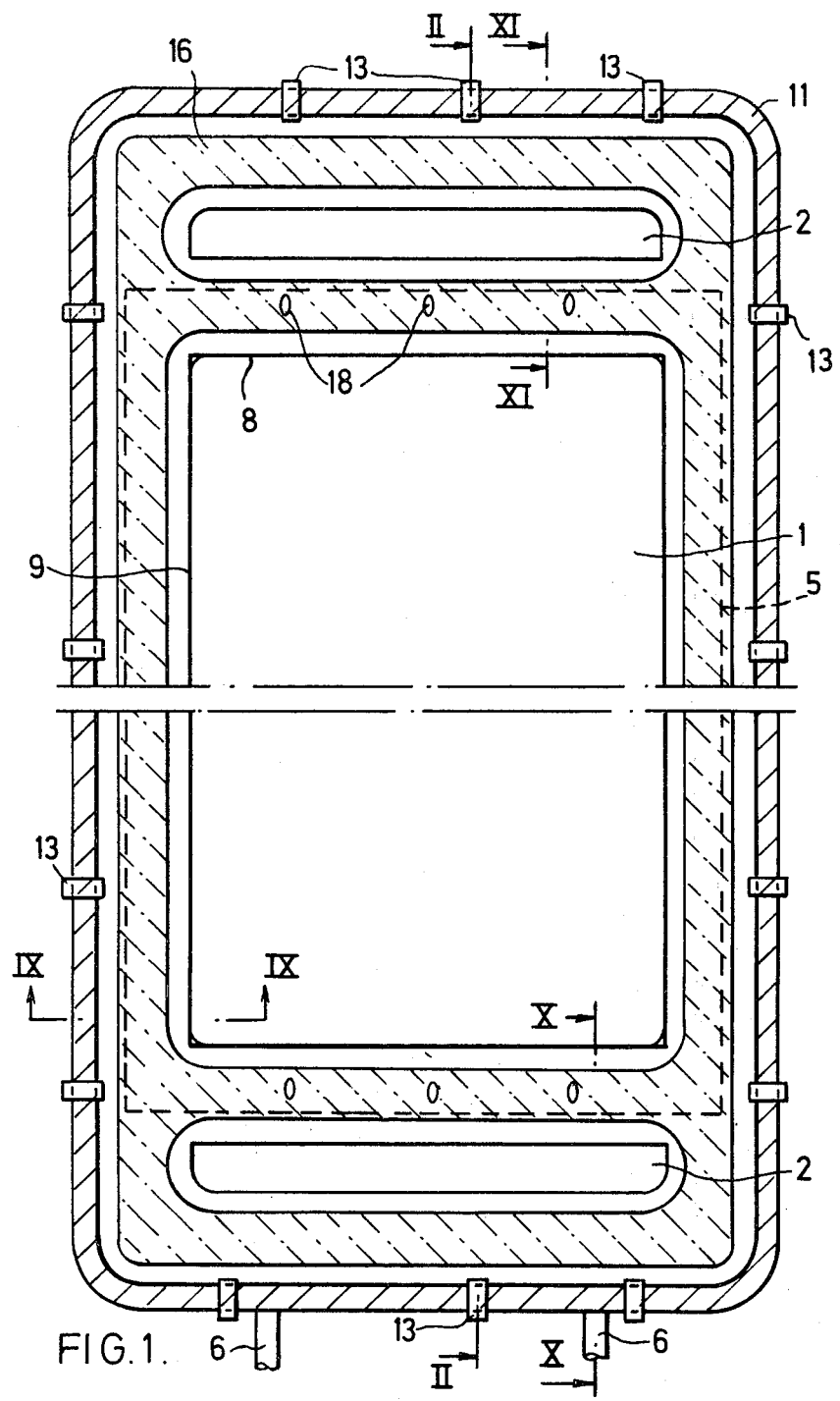
FIG. 1 is a plan view of one embodiment of a support-plate according to the present invention.
Figure 2:
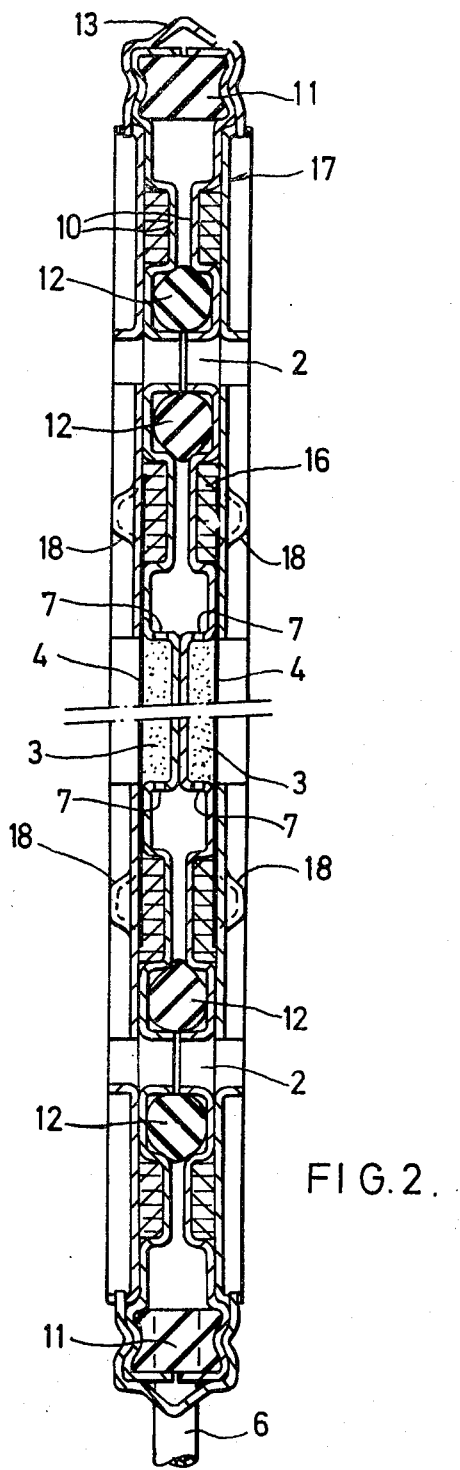
FIG. 2 is a cross-section taken along the line II—II of the support-plate of FIG. 1.

FIGS. 1 and 2 represent an embodiment of a support-plate according to the invention with a cell 1 on each of its faces and an elongate orifice 2 at each of its ends. Each cell contains a packing 3 consisting, for example, of a porous material such as non-woven polyethylene glycol terephthalate or paper impregnated with phenol/formaldehyde resin. A membrane 4 rests on each packing 3, these two membranes 4 being shown in thick lines in FIG. 2 and also in all the following Figures containing membranes 4 on plates represented in cross-section. In FIG. 1, the edges of the membranes 4 are indicated by the broken line 5. Each cell 1 communicates with a pipeline 6 for discharging the permeate via holes 7 provided on the transverse and lateral walls 8 and 9 of the cell 1.

The support-plate of FIGS. 1 and 2 comprises two identical elementary plates 10, one of which is better represented in FIGS. 6, 7 and 8. These plates are, for example, produced by stamping and can be made of metal such as steel, stainless steel, titanium and the like, or of metal which has been surface-treated, for example by enamelling. To achieve leakproofness inside the support-plate, a gasket 11 is positioned between the elementary plates 10 over the entire periphery of the support-plate. At the positions where the pipelines 6 for discharging the permeate are located, the gasket 11 has openings to enable the pipelines 6 to pass through, as is better represented in FIG. 10. In FIG. 1, the peripheral gasket 11 is represented by hatching to show its position inside the support-plate. In order to ensure leakproofness around each elongate orifice 2, gaskets 12 are provided inside the support-plate all around each orifice. Means are provided on the periphery of the support-plate for holding the two elementary plates 10. These means can be clips, such as that represented at 13, positioned at intervals on the periphery of the support-plate. These means can also be rivets 14 also positioned at intervals on the periphery of the support-plate, as represented in FIG. 9.

In order to fix the membrane 4 in a leakproof manner, the support-plate of FIGS. 1 and 2 has, on each of its faces, a groove 15 (FIG. 6) filled with a gasket 16. The groove 15 extends around the cell 1 and around each elongate orifice 2. Hence, the gasket 16, in plan view, has the shape represented by hatching in FIG. 1. The thickness of this gasket 16 is very slightly greater than the depth of the groove 15. On each face, the membrane 4 rests on this gasket 16 over the entire periphery of the cell 1, and a removable device 17, shown in FIGS. 2, 3, 4 and 5, presses the membrane in a leakproof manner against this gasket 16. This removable device 17 itself presses against the gasket 16 around each elongated orifice 2 and thus ensures leakproofness around these orifices 2. The removable device 17 of each face is advantageously held on the periphery of the support-plate by means of clips 13, which can at the same time clamp the elementary plates 10 to one another. The removable device 17 is generally fitted onto the support-plate in rims 19 provided on the latter. In FIG. 1, the removable device 17 is represented by a thick line, whilst the support-plate is represented by a fine line. Each removable device 17 thus has at each end, an elongated orifice 20 corresponding to the orifices 2 of the support-plate and one central opening 21, the dimensions of which are substantially those of the cell 1 of the support-plate. On the face of the removable device 17 which is not in contact with the gasket 16 or with the membrane 4, there rests a gasket 22, the positioning of which on the removable device 17 is represented in FIG. 3 by hatching. This gasket 22 is in contact with the adjacent support-plate or with an end-plate as will be better described hereafter, and is advantageously held in position by the fact that the internal and external edges 24 and 25 of the removable device 17 are slightly raised, as represented in FIGS. 4 and 5. There is no gasket 22 in the zone 23 situated between the central opening 21 and each elongated orifice 20 of each removable device 17. At least one resting stop 18, which, in an apparatus, is in contact with the adjacent support-plate or with an end-plate, is advantageously provided in each zone 23. In FIGS. 1 and 3, each zone 23 has three resting stops 18. The purpose of these resting stops 18 is to ensure contact under substantially uniform pressure, in the zone 23, between the gasket 16, the membrane 4 and the removable device 17.

The removable device 17 described above is advantageously produced by stamping and can be made of metal, such as steel, stainless steel, titanium and the like, or of metal which has been surface-treated, for example by enamelling. The removable device 17 is advantageously rigid, which makes it possible to reduce its thickness to the maximum extent, it being possible for the thickness to be between 0.2 and 1.5 mm.

Figure 9:
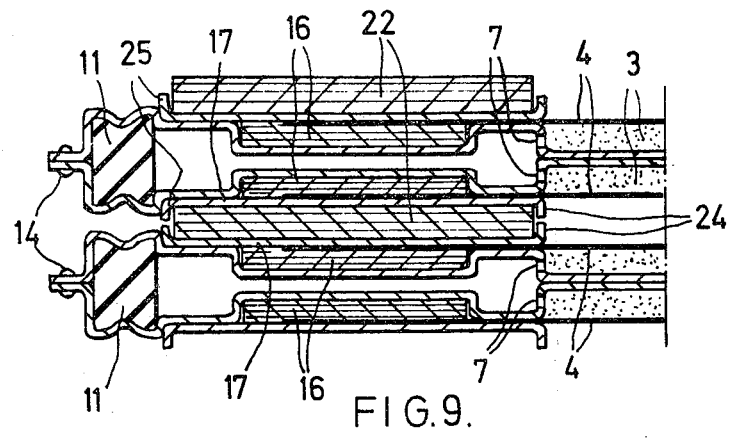
FIG. 9 is a cross-sectional view taken along the line IX—IX of FIG. 1.

FIGS. 9, 10 and 11 show two support-plates, as described above, separated by a gasket 22.

The groove 15 on the support-plate represented especially in FIGS. 1, 6, 7 and 8 is wider than it is deep. The gasket 16 is then a flat gasket, for example made of rubber or of silicone elastomer, which is preferably moulded from silicone elastomer and advantageously has, all around the cell 1 and around each elongate orifice 2 on its face opposite the removable device 17, at least one continuous small zone of excess thickness (not represented) called "grain of barley" by technicians. However, a support-plate according to the invention can have independent grooves 15 around the cell 1 and around each elongate orifice 2. In this case, the grooves 15 can advantageously have a substantially square or trapezoidal cross-section and can accept toroidal gaskets.

Figure 13:
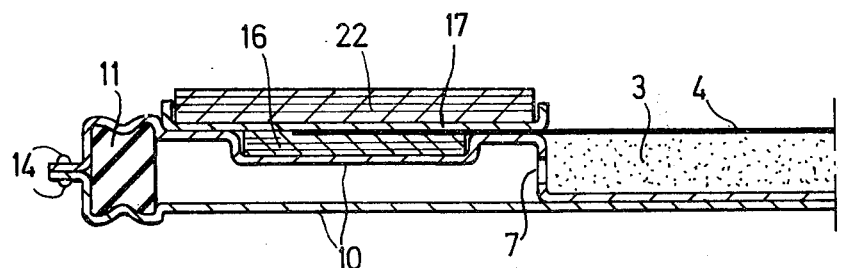
FIG. 13 is a cross-section showing a support-plate which has a cell only on one face.
Figure 14:
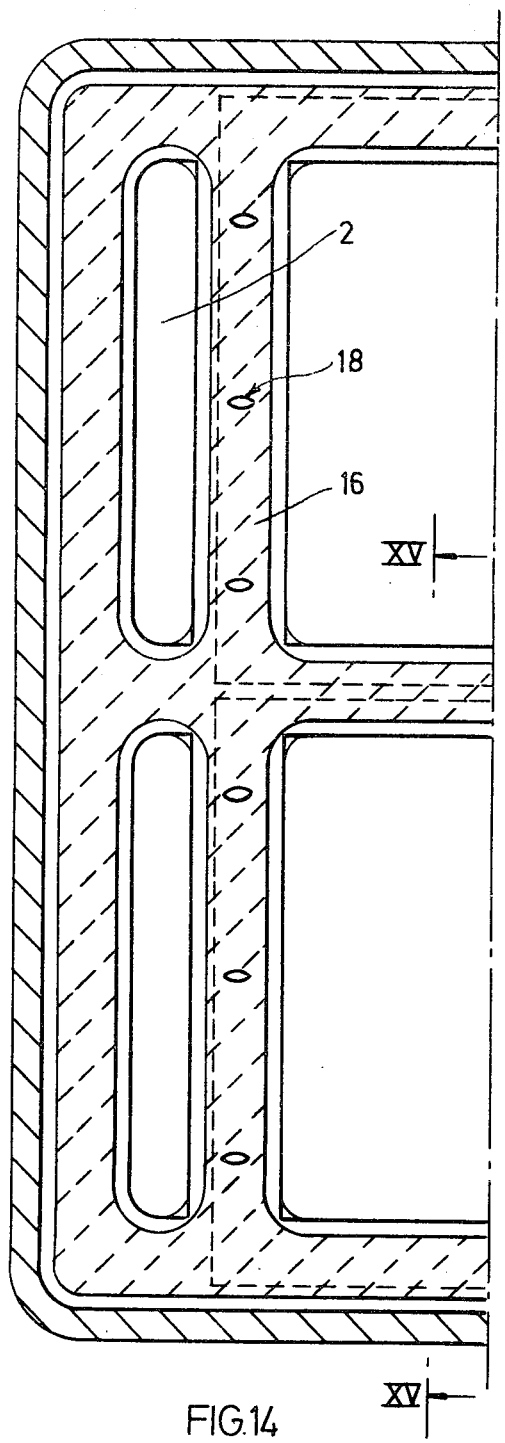
FIG. 14 is a partial plan view of a support-plate with two cells on each of its faces.
Figure 15:
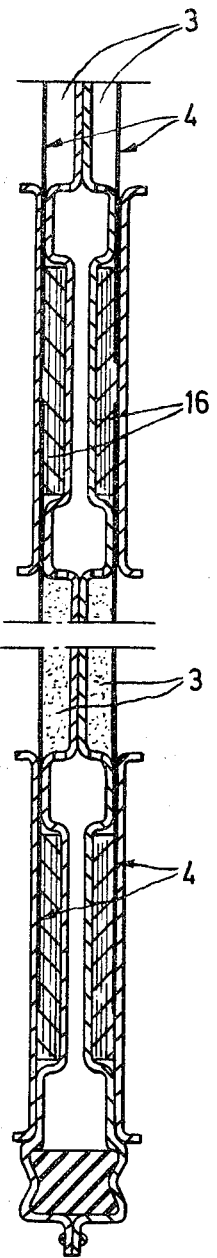
FIG. 15 is a partial cross-sectional view taken along the line XV—XV of FIG. 14.

As has already been stated, a support-plate according to the invention can comprise one membrane 4 and one removable device 17 for fixing the said membrane to only one of the faces of the plate. Such a support-plate is represented in FIG. 13 with two different elementary plates 10, only one of them then having a cell. A support-plate according to the present invention can have two or more cells 1 on one or each of its faces. A support-plate with two cells 1 on each of its faces is partially shown in FIGS. 14 and 15.

A support-plate can have at least one opening only at one of its ends, whether the said support-plate has a cell on one or both of its faces. In this case, the removable device 17 can also have at least one opening 20 at only one of its ends.

Figure 12:
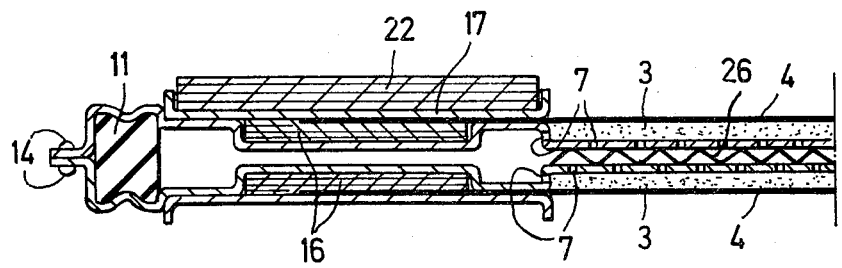
FIG. 12 is a cross-section perpendicular to the longitudinal axis of the plate showing a modified form of a support-plate.

A support-plate can have holes 7 for discharging the permeate at the base of the cell 1 when an elementary plate 10 is not in contact via the base of the cell wall with the other elementary plate 10 forming the support-plate. In this case, it is advantageous to place a grid 26, for example made of metal, between the two elementary plates 10, as this ensures rigidity of the support-plate whilst allowing the permeate to be discharged. Such an embodiment of a support-plate is represented in FIG. 12.

Furthermore, a support-plate may comprise two elementary plates 10 and may not require internal peripheral gaskets 11 or internal gaskets 12 around each opening 2. To achieve this, the two elementary plates made of metal are held together to form a support-plate whilst they are enamelled. The interstices between the two plates are thus sealed in a leakproof manner by the enamel. In order to hold the two elementary plates 10 together, the pipelines 6 can be welded to each of them, and then the enamelling is carried out.

Although each support-plate has been described as comprising two elementary plates 10, it is to be understood that a support-plate can consist of a single part, produced, for example, by machining or in accordance with an injection moulding technique.

Figure 18:
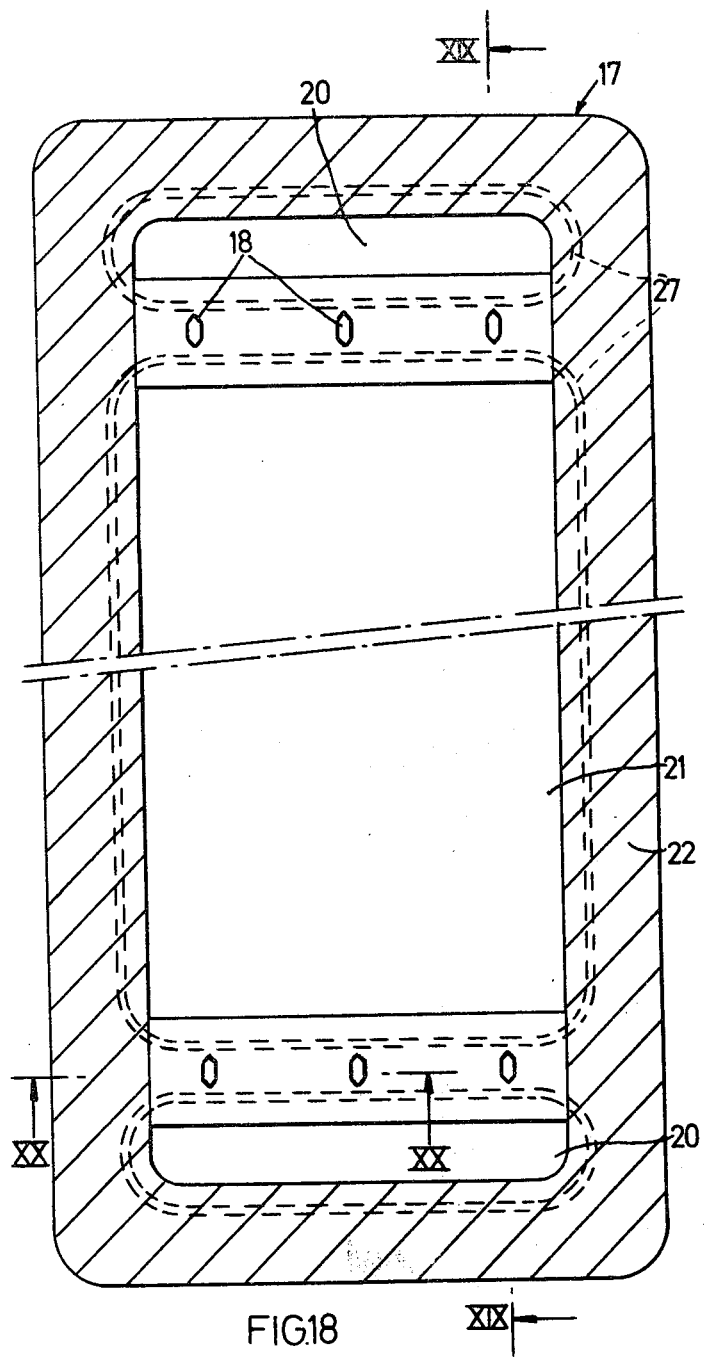
FIG. 18 is a plan view of the removable device of the support-plate of FIG. 16.
Figure 19:
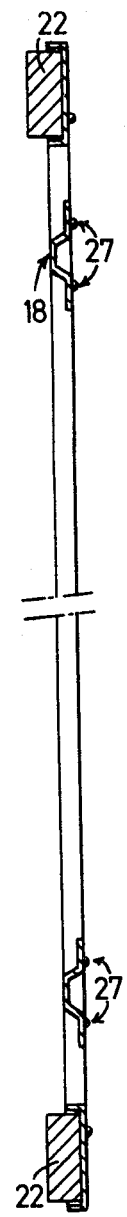
FIG. 19 is a cross-sectional view taken along the line XIX—XIX of the removable device of FIG. 18.
Figure 20:
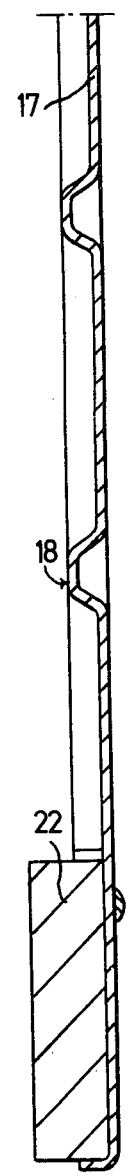
FIG. 20 is a cross-sectional view taken along the line XX—XX of the removable device of FIG. 18.
Figure 21:
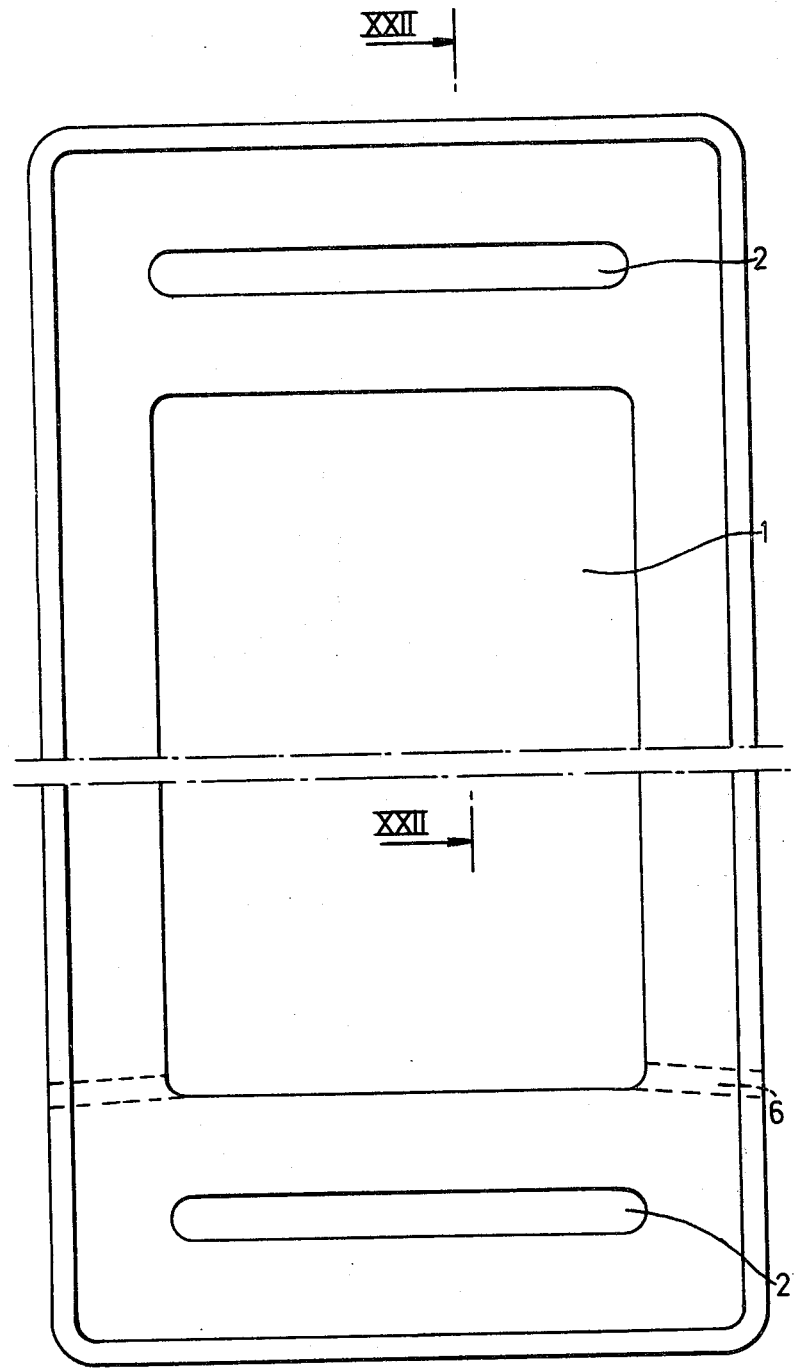
FIG. 21 is a plan view of the support-plate of FIG. 16.
Figure 22:
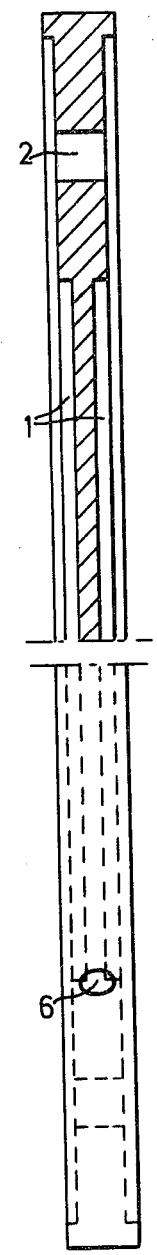
FIG. 22 is a view from the left, represented partially in cross-section, taken along the line XXII—XXII; of the support-plate of FIG. 16.

Numerous different embodiments of support-plates equipped with a removable membrane-fixing device according to the inventon will be apparent to technicians. Thus the removable membrane-fixing device 17 can have zones of excess thickness, such as cords, which are attached thereto. The hardness of these cords 27 which are firmly fixed to the removable device 17, is less than the hardness of the device. The cords are, for example, made if silicone elastomer, cellular polyvinyl chloride or cellular epoxy resin and are deposited on the removable device in accordance with a silk-screen printing or stencilling technique. These cords 27, represented better in FIGS. 18 and 19, are situated on the face of the removable device in contact with the membrane 4 and extend around the central opening 21 and around each elongate orifice 20 of the removable device. Together with the removable device 17, they thus ensure that the membrane is fixed in a leakproof manner around the entire periphery of the cell, and they also ensure leakproofness between each elongate orifice 2 of the support-plate and the removable device 17. This removable device 17, equipped with cords 27 on its face in contact with the membrane (or membranes) of the support-plate, can be positioned equally well on a support-plate comprising two elementary plates 10 or on one elementary plate made in a single part, as shown in FIGS. 21 and 22. FIGS. 16 and 17 represent a support-plate like that of FIGS. 21 and 22, with the removable device 17 described above and represented in FIGS. 18 to 20 with these added leakproofing cords 27. FIG. 16 shows exactly the relative positions of the various components of the support-plate, the line 5 in dots and dashes showing the edge of the membrane 4. A support-plate equipped with the removable device 17 of FIG. 18, with leakproofing cords 27, thus does not require any groove 15.

By way of a modification, the cords 27 can be firmly fixed to the support-plate instead of being firmly fixed to the removable device 17. Cords 27 can optionally be provided simultaneously on the removable device 17 and on the support-plate, these cords being advantageously parallel to one another once the removable device 17 is mounted on the support-plate.

An apparatus resulting from the juxtaposition of support-plates described above is represented in elevation in FIG. 23. It comprises a certain number of support-plates, each of which has, on each of its faces, a cell covered with a membrane and an elongated orifice at each of its ends; the said support-plates alternating with gaskets 22. These support-plates and gaskets 22 are arranged between two end-plates 28, one of which has at least one feed pipeline 29, for the fluid to be treated and the other of which has at least one pipeline 30 for discharging the treated fluid. The support-plates and the gaskets 22 are clamped between the two end-plates 28 by means of threaded rods 31. The membrane support-plates positioned vertically are supported, for example, by guide bars (not shown) and the permeate is discharged in the bottom part of each support-plate, at its lower end. FIGS. 10 and 11, in which two support-plates separated by a frame-gasket 22 are represented, represents respectively the upper and lower ends of two support-plates of the apparatus of FIG. 1. The fluid to be treated flows in parallel between each membrane support-plate, for example following the direction of the arrows which have only one arrowhead. The fluid to be treated thus passes through the elongated orifices 2 at each end of the support-plate, whilst the permeate, after having passed through the membranes 4, the porous support 3 and the holes 7 on the walls of the cell 1 and having flowed inside the plate, is discharged through the pipelines 6 as shown by the arrows with two arrowheads (FIG. 10).

Figure 23:
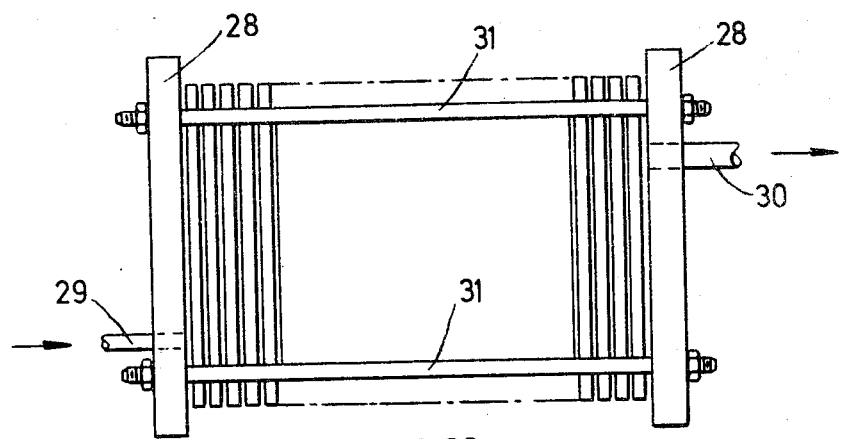
FIG. 23 is a side elevation of an apparatus according to the invention.
Figure 24:
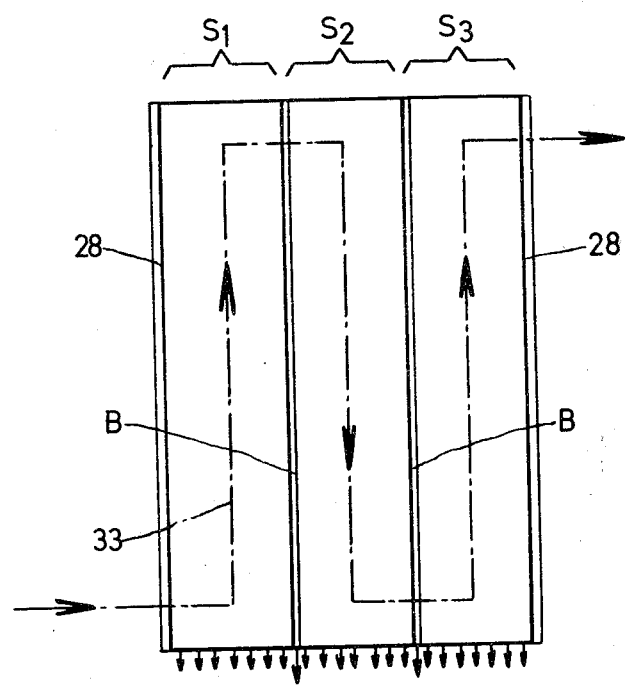
FIG. 24 is a diagrammatic view showing one way in which the fluid to be treated can flow inside an apparatus.

FIG. 24 represents diagrammatically an advantageous embodiment of an apparatus according to the invention, the outer appearance of which is that of the apparatus of FIG. 23 which has already been described. Between its two end-plates 28, this apparatus comprises three sub-combinations $S_1$, $S_2$ and $S_3$, each comprising a certain number of support-plates according to the invention having at least one membrane on each of their faces and at least one elongate orifice at each of their ends. Between each sub-combination there is provided a support-plate according to the invention, having at least one membrane on each of its faces, but having an elongate orifice only at one of its ends. This support-plate is denoted by the letter B in FIG. 24. Thus the plate B situated at the left, has its elongate orifice 2 located at the top of the apparatus, whilst the plate B, situated at the right, has its orifice located at the foot of the apparatus. The line with arrowheads 33 shows diagrammatically the flow in parallel of the liquid to be treated between each support-plate of a sub-combination, whilst the small arrows symbolise the pipelines 6 for discharging the permeate from each plate.

An apparatus according to the invention can also comprise only support-plates, each of which has an elongate orifice 2, only at one of its ends, the said support-plates being then arranged with their orifice alternately at the top and then at the bottom (in the case of support-plates in a vertical position), the fluid to be treated thus flowing through the apparatus in series from one support-plate to the other. This arrangement is called head-to-tail.

The separating apparatuses equipped with support-plates according to the invention have many advantages. The removable device for the leakproof fixing of the membrane is very reliable and easy to use. It does not present the risk of moving or of changing its position when the apparatus is being used. Thus the risks of leaks are greatly reduced. Moreover, this removable membrane-fixing device is particularly well suited to the use of stamped-out metal support-plates. This makes it possible considerably to widen the field of use of these apparatuses, especially because they are not affected by solvents or corrosive liquids. These apparatuses also have a better mechanical strength and a better heat-resistance. The stamped-out support-plates can be of very large dimensions without running the risk of buckling or deformation.

An apparatus equipped with support-plates according to the invention can be used in ultrafiltration, hyperfiltration, reverse osmosis or gas permeation in the chemical, pharmaceutical, paper-making, foodstuff and dyestuffs industries and the like. It is, for example, particularly well suited to the ultrafiltration of milk, which makes it possible to concentrate milk whilst allowing it to retain the bulk of its proteins but removing from it, in the ultrafiltrate, water, salts and sugars such as lactose, if the membrane used has a suitable cut-off zone.

We claim:
1. Apparatus for effecting separation by selective permeation, said apparatus comprising two end plates, at least one feed pipeline for the fluid to be treated passing through one of said end plates, at least one pipeline for discharging the untreated fluid passing through the other end plate, at least two support-plates positioned between said end plates, each support-plate comprising, in combination:
   a. a generally rectangular support-plate having opposite ends and faces;
   b. at least one orifice near one of its ends for the passage of fluid to be treated;
   c. at least one cell forming cavity on at least one of its faces;
   d. a membrane covering said at least one cell;
   e. means communicating said cell with the exterior for discharging the permeate which is passed through the membrane;
   f. a detachable device positioned on each face of the support-plate having a membrane, the device having dimensions substantially as those of the support-plate, and maintaining the membrane over the entire periphery of the cavity and having a central opening in register with the cavity and dimensions substantially those of the cavity, and an orifice in register with the orifice of the fluid to be treated of the support-plates and the dimensions of said orifice of the support plate; and
   g. a gasket separating in a fluidtight manner the two support-plates, said gasket being in contact with the detachable device and comprising a central opening in register with the cavity and of substantially the same width as that of the central opening in the detachable device and of which the length is substantially equal to twice the distance between a median plane perpendicular to the longitudinal axis of the support-plates and the part of the orifice of the detachable device most spaced from said median plane.

2. Apparatus as claimed in claim 1, in which support-plate has a cavity and a detachable device on each of its faces.

3. Apparatus as claimed in claim 1, in which each support-plate and each detachable device has at least one orifice for the passage of fluid to be treated at each of the ends, the length of the central opening of the gasket being substantially equal to the greatest distance between the said orifices of the support plates.

4. Apparatus as claimed in claim 1, in which each detachable device is maintained upon its support-plate by means situated at the periphery of the support-plate.

5. Apparatus as claimed in claim 1, in which each detachable device further comprises around each central opening and each orifice on the face in contact with the membrane, fluidtight means secured to the detachable device.

6. Apparatus as claimed in claim 5, in which the fluidtight means are continuous resilient cords, of a hardness less than that of the detachable device.

7. Apparatus as claimed in claim 1, in which each support-plate further comprises, on each of its faces in contact with the membrane, fluidtight means disposed around each cavity and around each of the elongate orifices.

8. Apparatus as claimed in claim 7, in which the fluidtight means are resilient cords, secured to said support-plate, the hardness of which is less than that of the support-plate.

9. Apparatus as claimed in claim 7, in which the fluidtight means comprises at least one gasket located in at least one groove.

10. Apparatus as claimed in claim 1, in which each detachable device further comprises at least one abutment applied on one face in contact with the fluid to be treated, between each orifice and its central opening.

11. Apparatus as claimed in claim 1, in which each detachable device further comprises internal and external raised edges, except between the central opening and the orifices, effective to hold the gasket in position.

12. Apparatus as claimed in claim 1, in which each support-plate comprises two elementary metallic pressed plates.

13. Apparatus as claimed in claim 12, in which each support-plate comprises a gasket around its periphery and a gasket around each orifice for the passage of fluid to be treated, these gaskets being situated between the two elementary plates.

14. Apparatus as claimed in claim 12, further comprising enamelling ensuring leakproofness at the periphery and at each orifice.

* * * * *